US012768484B2

(12) United States Patent
Jezierski

(10) Patent No.: US 12,768,484 B2
(45) Date of Patent: Oct. 20, 2026

(54) SYSTEMS OF REMOVABLY ATTACHABLE SAFETY CAPS AND PLUGS FOR TEMPORARILY SEALING OFF FLUID LINES AND IDENTIFYING THE FLUID LINES, AND METHODS

(71) Applicant: Michael J Jezierski, Ravenel, SC (US)

(72) Inventor: Michael J Jezierski, Ravenel, SC (US)

( * ) Notice: Subject to any disclaimer, the term of this patent is extended or adjusted under 35 U.S.C. 154(b) by 445 days.

(21) Appl. No.: 18/484,524

(22) Filed: Oct. 11, 2023

(65) Prior Publication Data

US 2025/0122968 A1 Apr. 17, 2025

(51) Int. Cl.
*F16L 55/11* (2006.01)
*B25H 3/04* (2006.01)
*F16L 55/115* (2006.01)

(52) U.S. Cl.
CPC ............. *F16L 55/11* (2013.01); *F16L 55/115* (2013.01); *B25H 3/04* (2013.01); *F16L 2201/60* (2013.01)

(58) Field of Classification Search
CPC ....... F16L 55/11; F16L 55/115; F16L 2201/60
See application file for complete search history.

(56) References Cited

U.S. PATENT DOCUMENTS 5,197,605 A * 3/1993 Hampton ............... B65D 71/00 184/102
6,056,015 A * 5/2000 Lewis ................... F16L 57/005 138/96 T
6,626,295 B1 * 9/2003 Vasudeva ............... B25H 3/023 220/521
6,698,601 B1 3/2004 Nez
7,150,362 B1 * 12/2006 Questiaux ................ B25H 3/04 211/183
10,300,595 B1 5/2019 Fletcher
2011/0041919 A1 * 2/2011 Turner .................. F16L 15/006 137/552
2015/0186837 A1 * 7/2015 Bianco .................. B60P 3/2245 235/381
2016/0121478 A1 5/2016 Schein et al.
2021/0376650 A1 12/2021 Newton et al.

OTHER PUBLICATIONS

Co-pending Related PCT Pat. App. Ser. No. PCT/US2024/050443, Filed Oct. 9, 2024, entitled, "Systems of Removably Attachable Safety Caps and Plugs for Temporarily Sealing Off Fluid Lines and Identifying the Fluid Lines, and Methods," International Preliminary Report on Patentability (IPRP) issued on Apr. 7, 2026 (14 Pages). [Claims priority to current application.].

* cited by examiner

*Primary Examiner* — Neel Girish Patel
(74) *Attorney, Agent, or Firm* — SMITH TEMPLE; Steven P. Wigmore

(57) ABSTRACT

A system of safety caps and plugs for marking lines when the lines are disconnected ensure that the disconnected lines can be matched up during reconnection. The system comprises at least a first safety cap and a first safety plug, but typically includes multiple safety caps and plugs of varying sizes. When lines, such as hydraulic fluid lines, for example, are disconnected, the safety caps and plugs are mated with fittings disposed on the ends of the disconnected lines. Mating the safety caps and plugs with the fittings seals the ends of the fluid lines, but also allows the ends to be identified and matched up easily at a later time during reconnection to prevent crossing lines. The safety caps and plugs include identifiers that are viewable to a user to allow the lines that were disconnected from one another to be matched up during reconnection.

16 Claims, 9 Drawing Sheets

FIG. 1A
FIG. 1B
SAFETY CAPS & PLUGS
3
JIC # 12
2
10
SAFETY CAPS & PLUGS
3
JIC # 12
11

SYSTEMS OF REMOVABLY ATTACHABLE SAFETY CAPS AND PLUGS FOR TEMPORARILY SEALING OFF FLUID LINES AND IDENTIFYING THE FLUID LINES, AND METHODS

TECHNICAL FIELD

The invention relates to a system of safety caps and plugs for sealing off fluid lines. More particularly, the invention relates to a system of safety caps and plugs for sealing off fluid lines that allows the fluid lines to be easily identified and matched up when it is time to reconnect them.

BACKGROUND

The number one rule of hydraulics is cleanliness is next to godliness. Hydraulic systems are sealed and are extremely reliable, but failure is usually caused by someone contaminating the system during maintenance or crossing lines during re-installation.

To perform maintenance on a hydraulic system, components are removed for service or replacement. Prior to removal, the components are connected by multiple lines, e.g., hoses, that must be kept clean, contaminant free and leak free. It is crucial to seal the hydraulic system to prevent hydraulic oil from leaking into the environment. It is imperative that each line be clearly marked with identifiers for proper re-installation. Misidentifying and crossing hydraulic lines during re-installation can cause catastrophic failure in the hydraulic system that can result in serious injury or death.

The options available today for marking hydraulics lines with identifiers to ensure that they are properly reconnected during re-installation are colored zip ties. To disconnect a hydraulic line, a male-threaded connector on the line to be disconnected is disconnected from a female-threaded connector on the opposite line. Zip ties of the same color are zip tied to each line so that the lines can be identified and matched up during re-installation to prevent crossing of hydraulic lines. However, zip ties are limited by available distinguishable colors and frequently fall off of the lines making it difficult or impossible to ensure that crossing of hydraulic lines does not occur. Another option is to use twist on tags, but they are fragile and tend to fall off as well. Consequently, many pieces of equipment and components become damaged unnecessarily due to a crossed line caused by improper marking during a repair or routine maintenance.

A need exists for a system for sealing off fluid lines such as hydraulic lines, for example, that allows the lines to be easily identified and matched up when it is time to reconnect them, thereby eliminating the possibility of crossed lines.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION

Figure 1A:
FIG. 1A is a top perspective view of the safety cap of the present disclosure in accordance with a representative embodiment in which the cap is a female-threaded cap configured to thread onto a male-threaded fitting disposed on an end of a fluid line after the male-threaded fitting has been disconnected from a female-threaded fitting disposed on an end of another fluid line.

A system of safety caps and plugs and a method are provided for marking lines when the lines are disconnected to ensure that the disconnected lines can be matched up during reconnection. The system comprises at least a first safety cap and a first safety plug, but typically includes multiple safety caps and multiple safety plugs of varying sizes. When lines, such as hydraulic fluid lines, for example, are disconnected, the safety caps and plugs are mated with fittings disposed on the ends of the disconnected lines. Mating the safety caps and plugs with the fittings seals the ends of the fluid lines, but also allows the ends to be identified and matched up easily at a later time during reconnection to prevent crossing of lines. The safety caps and plugs include identifiers that are viewable to a user to allow the lines that were disconnected from one another to be matched up during reconnection.

In the following detailed description, a few exemplary, or representative, embodiments are described to demonstrate the inventive principles and concepts. For purposes of explanation and not limitation, the representative embodiments disclosing specific details are set forth in order to provide a thorough understanding of an embodiment according to the present disclosure. However, it will be apparent to one having ordinary skill in the art having the benefit of the present disclosure that other embodiments that depart from the specific details disclosed herein remain within the scope of the appended claims. Moreover, descriptions of well-known apparatuses and methods may be omitted to avoid obscuring the description of the representative embodiments. Such methods and apparatuses are clearly within the scope of the present teachings, as will be understood by those of skill in the art.

The terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms “a,” “an,” and “the” include both singular and plural referents, unless the context clearly dictates otherwise. Thus, for example, “a device” includes one device and plural devices.

Relative terms may be used to describe the various elements’ relationships to one another, as illustrated in the accompanying drawings. These relative terms are intended to encompass different orientations of the device and/or elements in addition to the orientation depicted in the drawings.

It will be understood that when an element is referred to as being “connected to” or “coupled to” another element, it can be directly connected or coupled, or intervening elements may be present.

Exemplary, or representative, embodiments will now be described with reference to the figures, in which like reference numerals represent like components, elements or features. It should be noted that features, elements or components in the figures are not intended to be drawn to scale, emphasis being placed instead on demonstrating inventive principles and concepts.

Figure 1B:
FIG. 1B is a top perspective view of the safety plug of the present disclosure in accordance with a representative embodiment in which the safety plug is a male-threaded plug configured to thread into a female-threaded fitting disposed on an end of a fluid line after the female-threaded fitting has been disconnected from the male-threaded fitting disposed on the end of the other fluid line.

FIG. 1A is a top perspective view of the safety cap 1 in accordance with a representative embodiment in which the cap 1 is a female-threaded cap configured to thread onto a male-threaded fitting of a fluid line after the male-threaded fitting has been disconnected from a female-threaded fitting of another fluid line. FIG. 1B is a top perspective view of the safety plug 10 in accordance with a representative embodiment in which the plug 10 is a male-threaded plug configured to thread into a female-threaded fitting of a fluid line after the female-threaded fitting has been disconnected from the male-threaded fitting of the other fluid line.

As will be described below in more detail with reference to FIGS. 2 and 3, when the male-threaded fitting of a fluid line has been disconnected from the female-threaded fitting of another fluid line, the female-threaded cap 1 is threaded onto the male-threaded fitting and the male-threaded plug 10 is threaded into the female-threaded fitting. Once the safety cap 1 and plug 10 have been installed on the fittings on the ends of the respective fluid lines, they prevent dust, water and other contaminants from entering the ends of the fluid lines.

In addition, identifiers 3 disposed on the head surfaces 2 and 11, respectively, of the cap 1 and plug 10, respectively, identify the lines so that the lines can be easily and quickly reconnected to one another during re-installation, thereby eliminating the risk of reconnecting the wrong lines. In accordance with this representative embodiment, the cap 1 and plug 10 are made of a metallic material and the identifier is the numeral “1” engraved into the head surfaces of the cap 1 and plug 10. However, the identifiers can be any suitable identifiers including, but not limited to, numbers, letters, colors, stickers, print, or combinations thereof. Also, the cap 1 and plug 10 can be made of suitable material including, but not limited to, metal, hard plastic, ceramics or combinations thereof.

For ease of illustration and discussion, it will be assumed that the safety cap 1 and plug 10 are configured to mate with fittings disposed on the ends of hydraulic fluid lines. It should be noted, however, that the inventive principles and concepts of the present disclosure apply to any types of lines for which there is a need to prevent crossing lines during re-installation, including, for example, various types of fluid lines, gas lines and electrical lines. The safety caps and plugs of the present disclosure can be shaped and sized to mate with whatever types of fittings are disposed on the ends of the lines. Thus, while the inventive principles and concepts are being described herein with reference to hydraulic lines, those skilled in the art will understand the manner in which the inventive principles and concepts can be applied to other types of lines with other types of end fittings.

Because hydraulic lines can be of many different sizes and styles, the male-threaded and female-threaded fittings disposed on the ends of hydraulic fluid lines can also be of many different sizes and styles. In accordance with a preferred embodiment, the safety caps and plugs of the present disclosure are of different sizes and styles to accommodate the different sizes and styles of fittings disposed on the ends of hydraulic fluid lines. In the representative embodiment shown in FIGS. 1A and 1B, the cap 1 and plug 10 are of the same size and style, which is Joint Industry Council (JIC) #12. JIC fittings are known in the industry and are compression fittings machined with a 37-degree flare seating surface and parallel threads. They are commonly manufactured in brass, carbon, stainless steel, and nickel alloys. They are the most common types of fittings in hydraulic fluid systems. In accordance with this embodiment, the cap 1 and plug 10 are sized and shaped to mate with JIC #12 size fittings disposed on the ends of hydraulic fluid lines.

Figure 2:
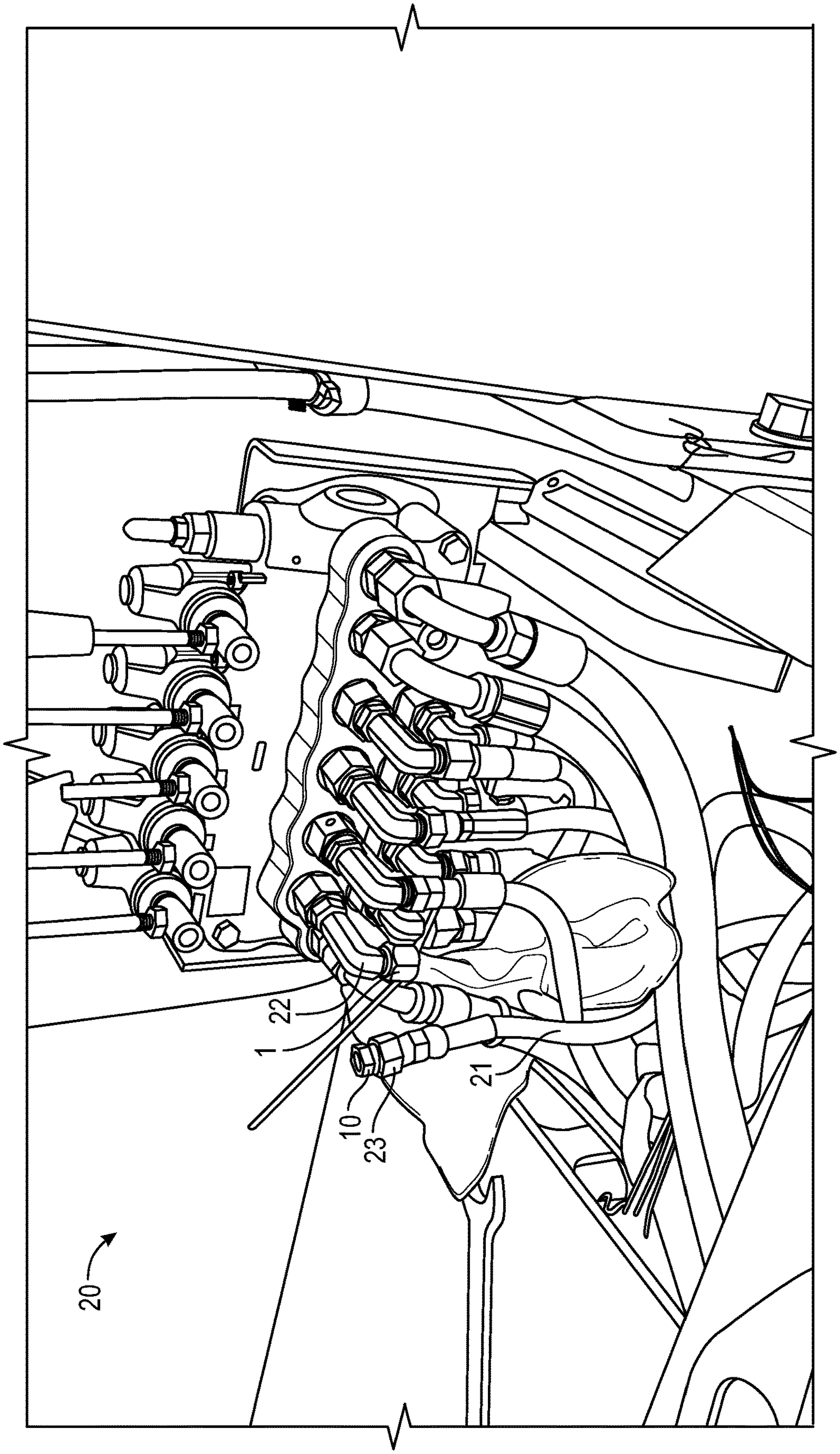
FIG. 2 is a perspective view of a hydraulic valve assembly with which the safety caps and plugs of the present disclosure can be used.

FIG. 2 is a perspective view of a hydraulic valve assembly 20 with which the safety caps and plugs of the present disclosure can be used, although the inventive principles and concepts are not limited to the safety caps and plugs being used with such a valve assembly 20. The valve assembly 20 shown in FIG. 2 is being provided to demonstrate an example of the manner in which the safety caps and plugs of the present disclosure can be used. FIG. 2 shows a flexible hose hydraulic fluid line 21 that has been disconnected from a hard metal hydraulic fluid line 22 of the valve assembly 20. FIG. 2 also shows the cap 1 shown in FIG. 1 threadingly engaged with the male-threaded fitting disposed on the end of line 22 and shows the plug 10 shown in FIG. 1 threadingly engaged with the female-threaded fitting 23 disposed on the end of line 21. Once installed as shown, the cap 1 and plug 10 prevent contaminants from entering the lines 21 and 22.

The cap 1 shown in FIG. 1 can be threaded by hand onto the male-threaded fitting disposed on the end of line 22. Likewise, the plug 10 shown in FIG. 1 can be threaded by hand into the female-threaded fitting 23 disposed on the end of line 21. To determine which size safety cap and plug need to be used with the lines 21 and 22, the user simply disconnects the lines 21 and 22 from one another and determines by eye or by choosing the cap and plug that the user estimates will fit and attempting to thread the cap and plug onto and into the male- and female-threaded fittings disposed on the ends of the lines 22 and 21, respectively. The tasks of determining which size cap and plug to use and of installing the cap and plug can be performed quickly and easily by a trained technician. When the lines 21 and 22 are to be reconnected during re-installation, the user simply identifies the lines 21 and 22 that have matching identifiers 3 (FIGS. 1A and 1B) and then reconnects the lines 21 and 22 having the matching identifiers. In this way, the cap 1 and plug 10 also prevent a technician from connecting the wrong lines, i.e., from crossing lines.

Figure 3:
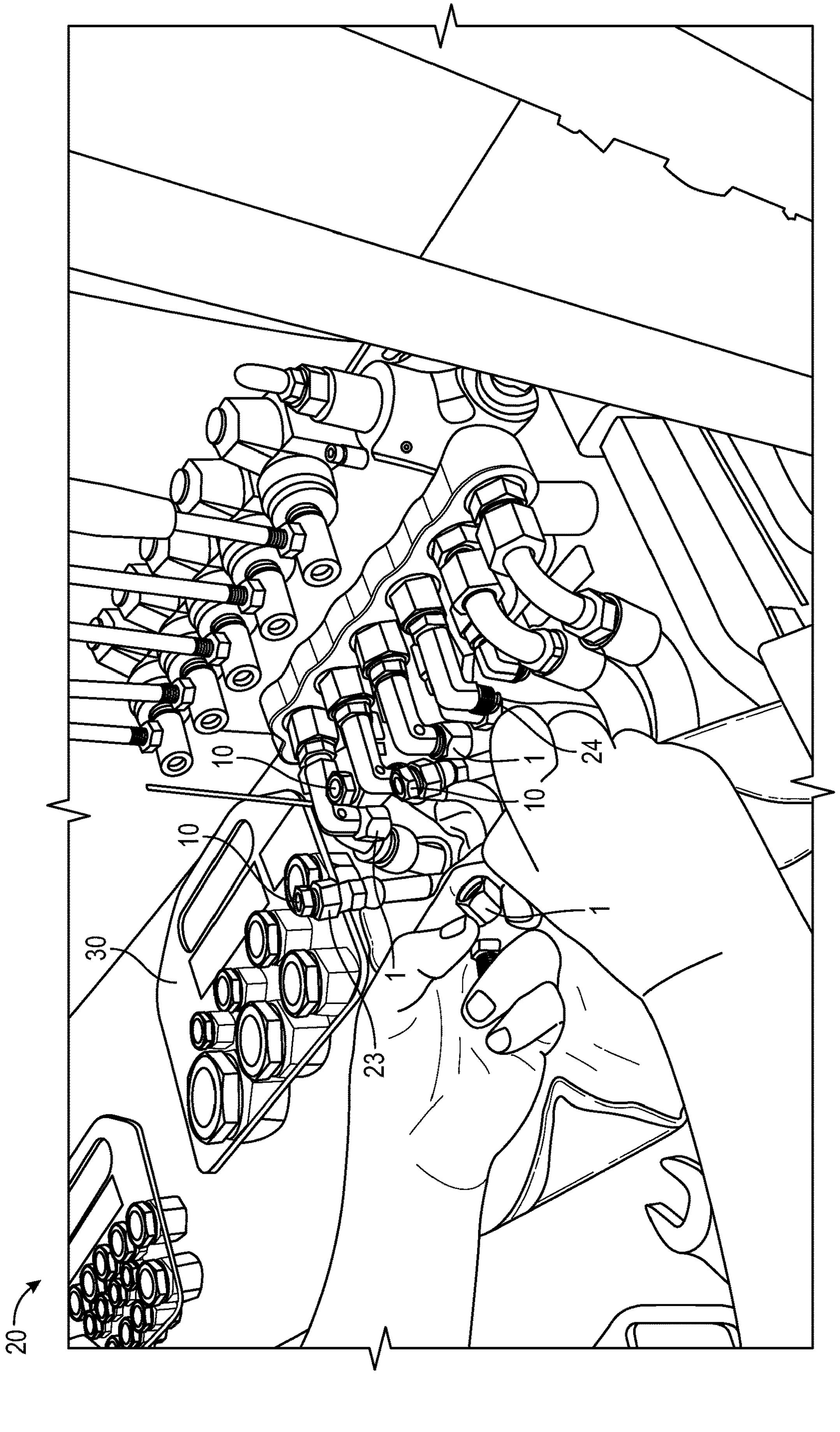
FIG. 3 is a perspective view of the hydraulic valve assembly shown in FIG. 2 with several safety caps and plugs of the type shown in FIG. 1 installed on the male-threaded and female-threaded fittings, respectively, of fluid lines as a technician is about to install one of the caps on one of the male-threaded fittings by hand.

FIG. 3 is a perspective view of the hydraulic valve assembly 20 shown in FIG. 2 with several caps land plugs 10 installed on the male-threaded and female-threaded fittings 24 and 23, respectively, of lines as a technician is about to install a cap 10 on one of the male-threaded fittings 24 by hand. FIG. 3 also shows a safety cap and plug holder 30 that is configured to hold caps and plugs of different sizes. Examples of the holder 30 and of different sizes of caps and plugs that are held in the holder 30 are described below with reference to FIGS. 4A-7.

Figure 4A:
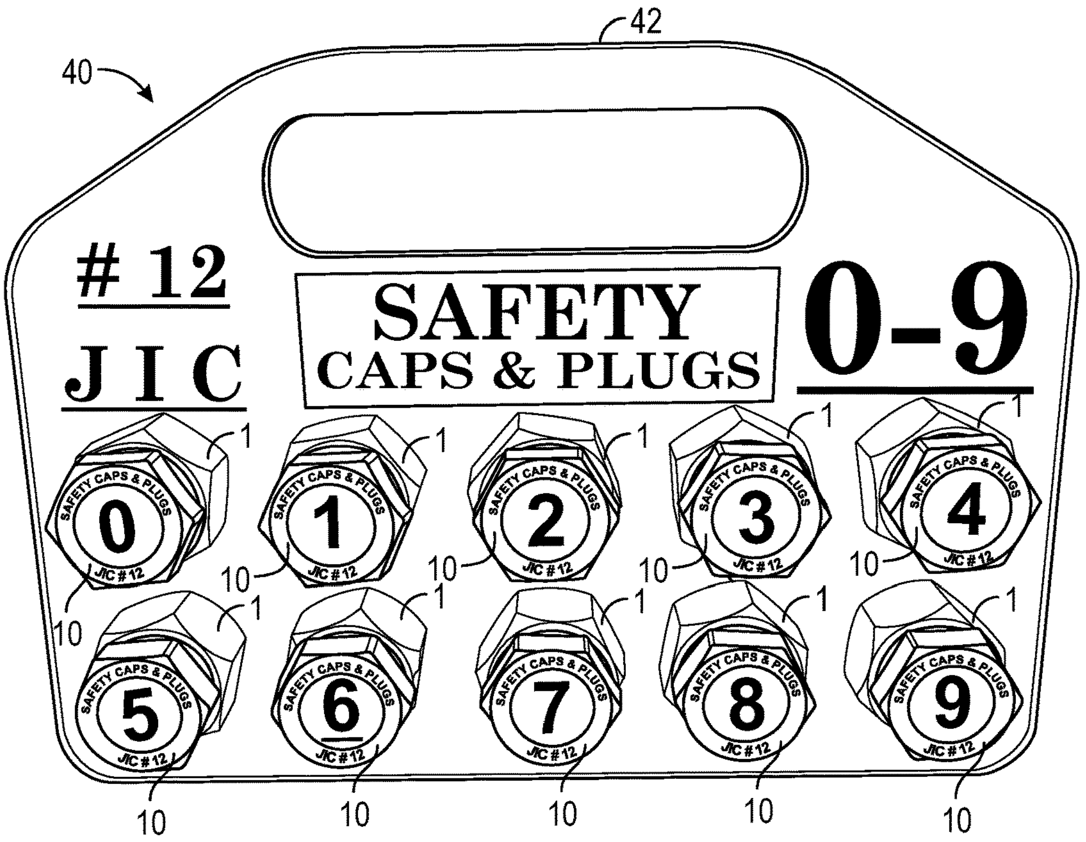
FIGS. 4A and 4B show examples of a holder configured to hold only JIC #12 size safety caps and plugs of the present disclosure in accordance with a representative embodiment.
Figure 4B:
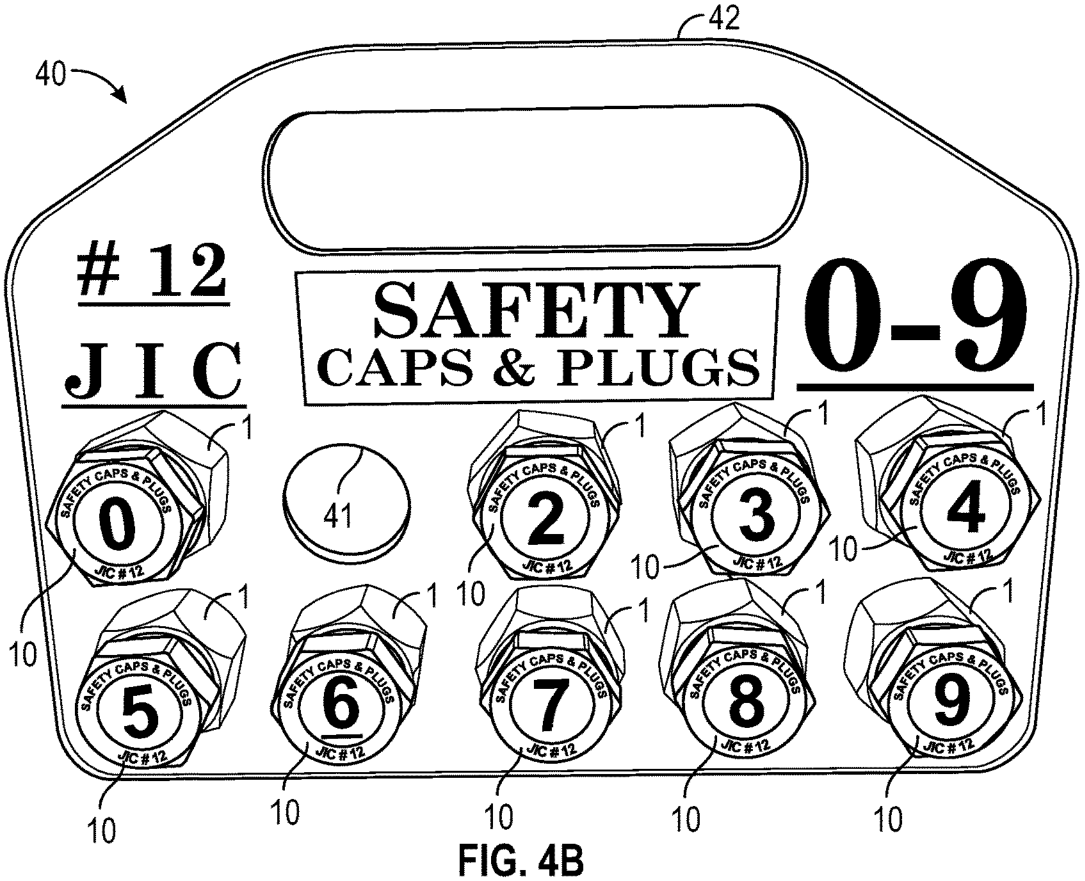

FIGS. 4A and 4B show examples of a holder 40 similar to the holder 30 shown in FIG. 3 except that the holder 40 is configured to hold only JIC #12 size caps 1 and plugs 10. FIG. 4B is identical to FIG. 4A except that the cap 1 and plug 10 identified by numeral "1" shown in FIGS. 1A and 1B have been removed from the holder 40 to reveal an opening 41 in the holder 40. The holder 40 has a front side and a backside. The male-threaded ends of the plugs 10 are inserted through the openings 41 from the front side of the holder 40 and the caps 1 are threaded onto the male-threaded ends of the respective plugs 10 from the back side of the holder 40. The openings 41 are slightly smaller in diameter than the diameters of the caps 1 and plugs 10 such that the plugs 10 and caps 1 are in abutment with the front side and the back side, respectively, when they are mounted in the holder 40 and are threadingly engaged with one another.

As can be seen in FIGS. 4A and 4B, although all of the caps 1 and plugs 10 are of size JIC #12, they have different numbers on them. In accordance with this representative embodiment, identifiers "0"-"9" are used to identify the ten pairs of caps 1 and plugs 10. Thus, ten different pairs of hydraulic fluid lines having JIC #12 size fittings can be identified using the set of caps 1 and plugs 10 shown in FIGS. 4A and 4B. As indicated above with reference to FIGS. 1A and 1B, any suitable identifiers can be used for this purpose. With reference again to FIGS. 1A and 1B, in accordance with a preferred embodiment the caps 1 and plugs 10 also have their sizes printed or engraved on their head surfaces, e.g., "JIC #12".

The holder 40 can be made of any suitable material and can have any shape and size. The shape of the holder 40 shown in FIGS. 4A and 4B is advantageous because it presents the caps 1 and plugs 10 laterally side by side in an array that is easily visible to the user, easy to organize and easy to handle. In accordance with this representative embodiment, the holder 40 comprises a generally flat, clear, hard plastic material and a portion of the holder 40 is removed to form a handle 42 at an upper portion of the holder 40 to allow it to be easily carried.

Figure 5:
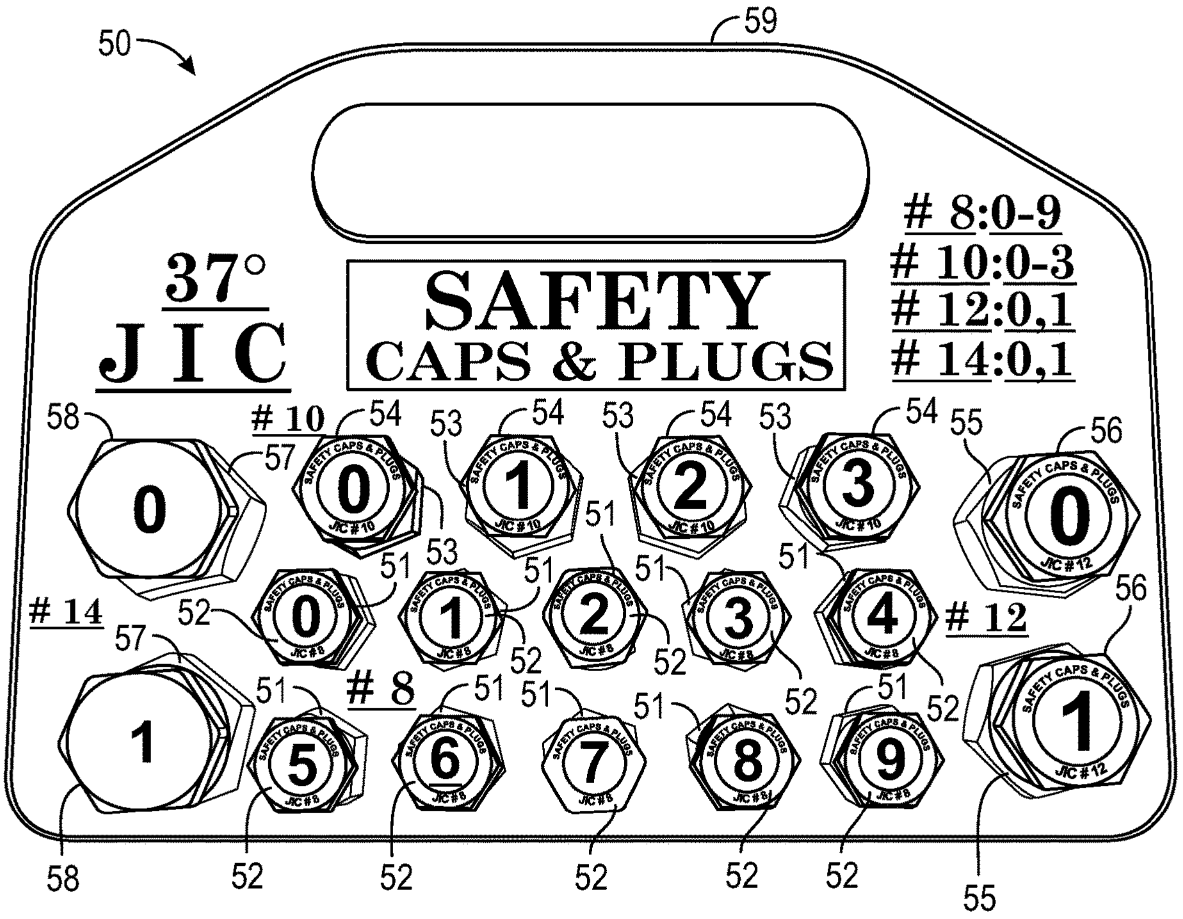
FIG. 5 shows an example of a holder similar to the holder shown in FIGS. 4A and 4B, but configured to hold JIC #s 8, 10, 12 and 14 size safety caps and plugs of the present disclosure in accordance with an representative embodiment.

FIG. 5 shows an example of a holder 50 similar to the holder 40 shown in FIGS. 4A and 4B, but configured to hold JIC #s 8, 10, 12 and 14 size caps and plugs. The holder 50 has ten JIC #8 size caps 51 and plugs 52 mounted on it labeled with identifiers "0"-"9" for use with ten pairs of hydraulic fluid lines having size JIC #8 fittings disposed on their ends. The holder 50 has four JIC #10 size caps 53 and plugs 54 mounted on it labeled with identifiers "0"-"3" for use with four pairs of hydraulic fluid lines having size JIC #10 fittings disposed on their ends. The holder 50 has two JIC #12 size caps 55 and plugs 56 mounted on it labeled with identifiers "0"-"1" for use with two pairs of hydraulic fluid lines having size JIC #12 fittings disposed on their ends. The holder 50 has two JIC #14 size caps 57 and plugs 58 mounted on it labeled with identifiers "0"-"1" for use with two pairs of hydraulic fluid lines having size JIC #14 fittings disposed on their ends.

As with the holder 40, the holder 50 can be made of any suitable material and can have any shape and size. In accordance with this representative embodiment, the holder 50 comprises a clear hard plastic material and a portion of the holder 50 has been removed to form a handle 59 at an upper portion of the holder 50 to allow it to be easily carried.

Figure 6:
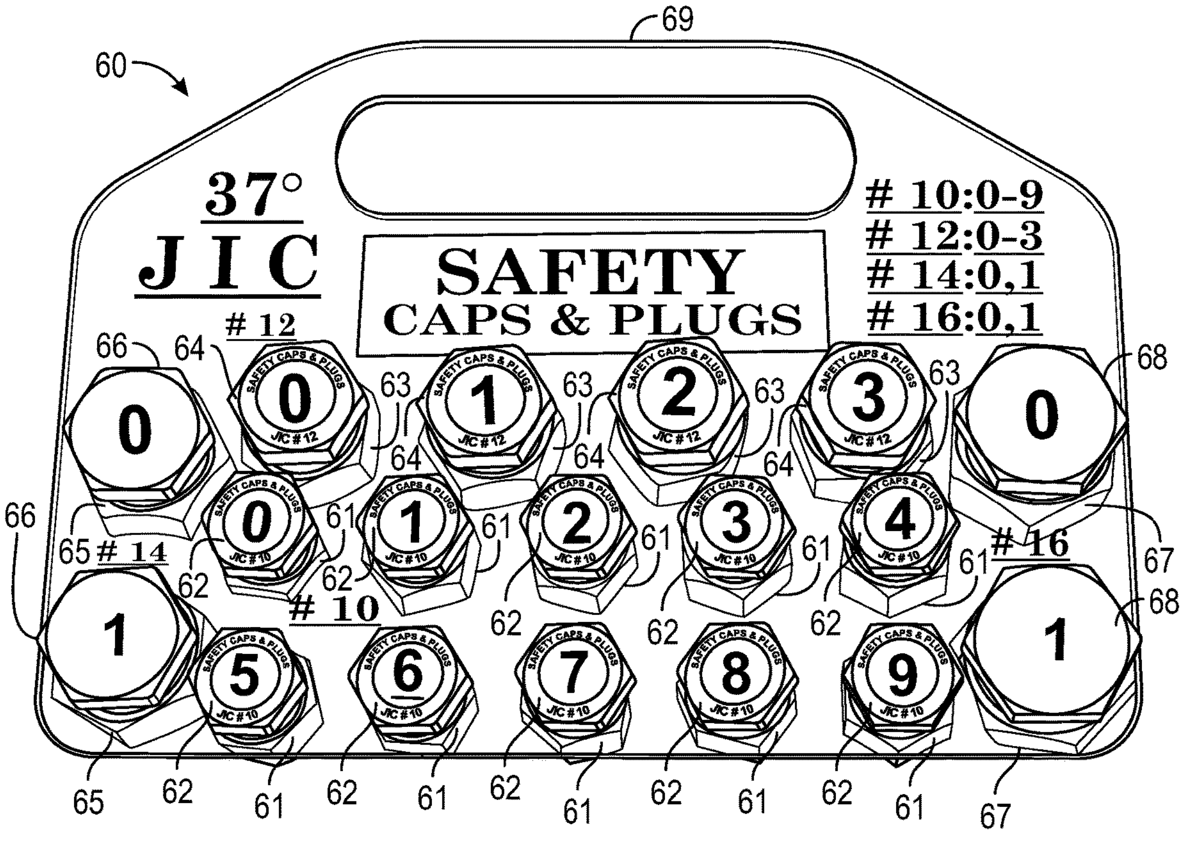
FIG. 6 shows an example of a holder similar to the holder shown in FIG. 5, but configured to hold JIC #s 10, 12, 14 and 16 size caps and plugs of the present disclosure in accordance with an representative embodiment.

FIG. 6 shows an example of a holder 60 similar to the holder 50, but configured to hold JIC #s 10, 12, 14 and 16 size caps and plugs. The holder 60 has ten JIC #10 size caps 61 and plugs 62 mounted on it labeled with identifiers "0"-"9" for use with ten pairs of hydraulic fluid lines having size JIC #10 fittings disposed on their ends. The holder 60 has four JIC #12 size caps 63 and plugs 64 mounted on it labeled with identifiers "0"-"3" for use with four pairs of hydraulic fluid lines having size JIC #12 fittings disposed on their ends. The holder 60 has two JIC #14 size caps 65 and plugs 66 mounted on it labeled with identifiers "0"-"1" for use with two pairs of hydraulic fluid lines having size JIC #14 fittings disposed on their ends. The holder 60 has two JIC #16 size caps 67 and plugs 68 mounted on it with identifiers "0"-"1" for use with two pairs of hydraulic fluid lines having size JIC #16 fittings disposed on their ends.

As with the holders 40 and 50, the holder 60 can be made of any suitable material and can have any shape and size. In accordance with this representative embodiment, the holder 60 comprises a clear hard plastic material and a portion of the holder 60 has been removed to form a handle 69 at an upper portion of the holder 60 to allow it to be easily carried.

The safety cap and plug sets shown in FIGS. 4-6 are designed to have the proper quantities and sizes needed to work on most hydraulic valve assemblies that are in existence today. Because the holders of the present disclosure are designed to hold the proper quantities and sizes of caps and plugs needed to work on most hydraulic valve assemblies that are in existence today, the holders can be used as kits that are useful even without the identifiers 3 (FIGS. 1A and 1B) and size indicia on the head surfaces of the caps and plugs. The holders are advantageous not only because they provide an efficient and simple way to hold the caps and plugs, but because they are designed to hold the proper quantity and sizes needed for most valve assemblies. As indicated above, however, the holders can have a variety of shapes and configurations. For example, the holder can comprise a tube or a piece of pipe that is capped at the bottom and at the top with screw-in caps with an ear on one or both caps to allow the holder to be hung on a wall or other external structure.

As indicated above, the safety caps and plugs of the present disclosure can be configured to mate with a variety of fluid line end fittings of a variety of sizes. The JIC fittings described above are only one example of the type of fittings with which the safety caps and plugs of the present disclosure can be used. The attached Appendix provides a list of a plurality of fluid line end fittings of a plurality of sizes that the safety caps and plugs of the present disclosure can be configured to be used with to achieve the goals described above with reference to FIGS. 1A-6. It should be noted, however, that the inventive principles and concepts of the present disclosure are not limited to the types and sizes shown in the Appendix, as will be understood by those of skill in the art in view of the description provided herein.

Figure 7:
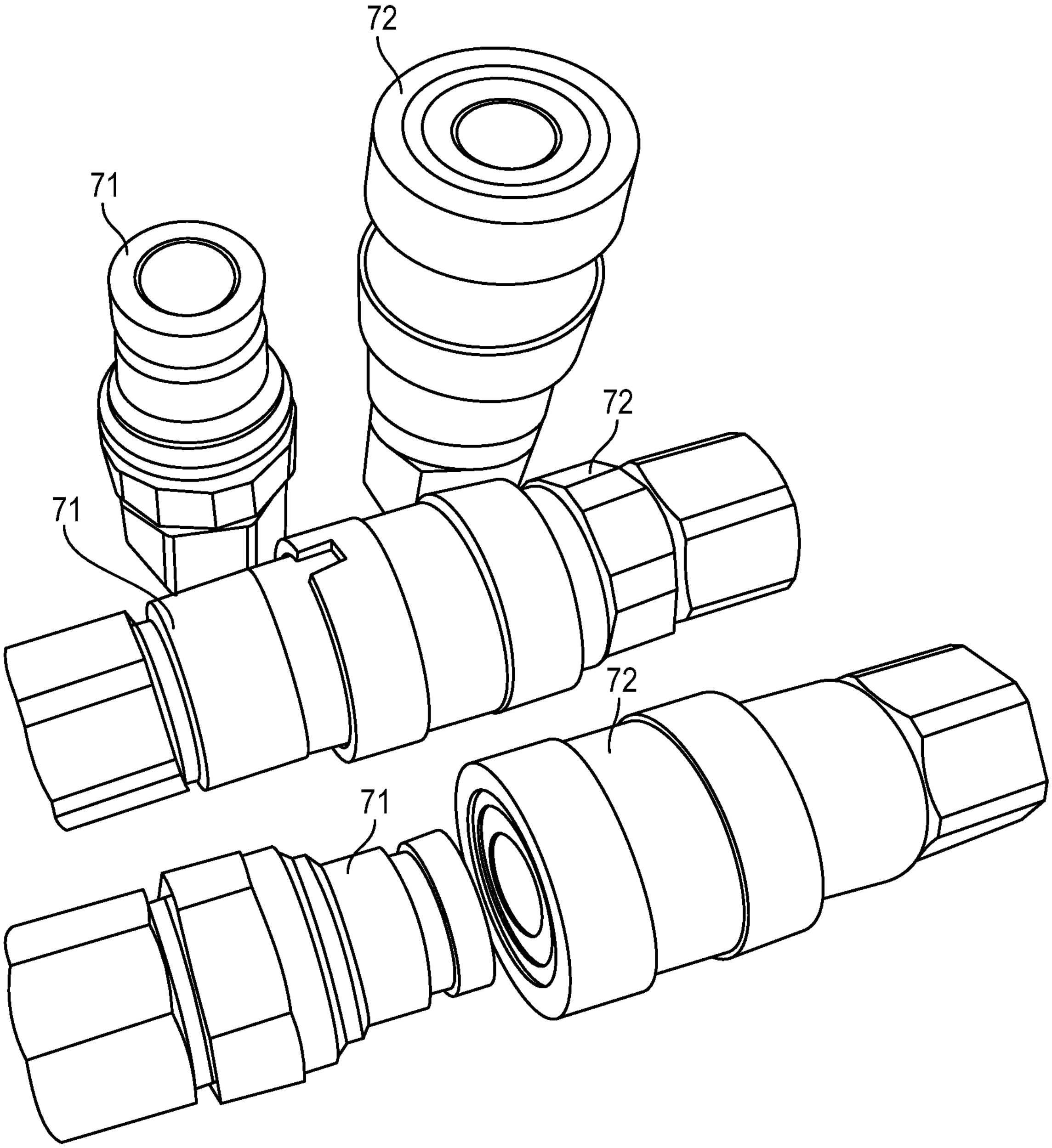
FIG. 7 shows perspective views of known hydraulic fluid line fittings that demonstrate another example of how the safety cap and plug of the present disclosure can be configured.

It should also be noted that although the safety caps and plugs of the present disclosure have been described above with reference to FIGS. 1A-6 as being configured to mate with threaded fluid line end fittings, they can also be configured to mate with fluid line end fittings that are not threaded. For example, FIG. 7 shows perspective views of known hydraulic fluid line fittings 71 and 72 that are configured to be removably connected together via mechanisms other than threads. These fittings are commonly referred to as flat-faced hydraulic quick couplings or flat-faced hydraulic quick connectors. These types or styles of fittings are made by several different manufacturers. The safety plug of the present disclosure can have the coupling configuration of the male fitting 71 and the safety cap of the present disclosure can have the coupling configuration of the female fitting 72. In other words, if the fitting 72 is disposed on the end of one fluid line, it would be plugged with a safety plug of the present disclosure having the coupling configuration of the fitting 71. Similarly, if the fitting 71 is disposed on the end of the opposite fluid line, it would be capped with a safety cap of the present disclosure having the coupling configuration of the fitting 72.

Figure 8:
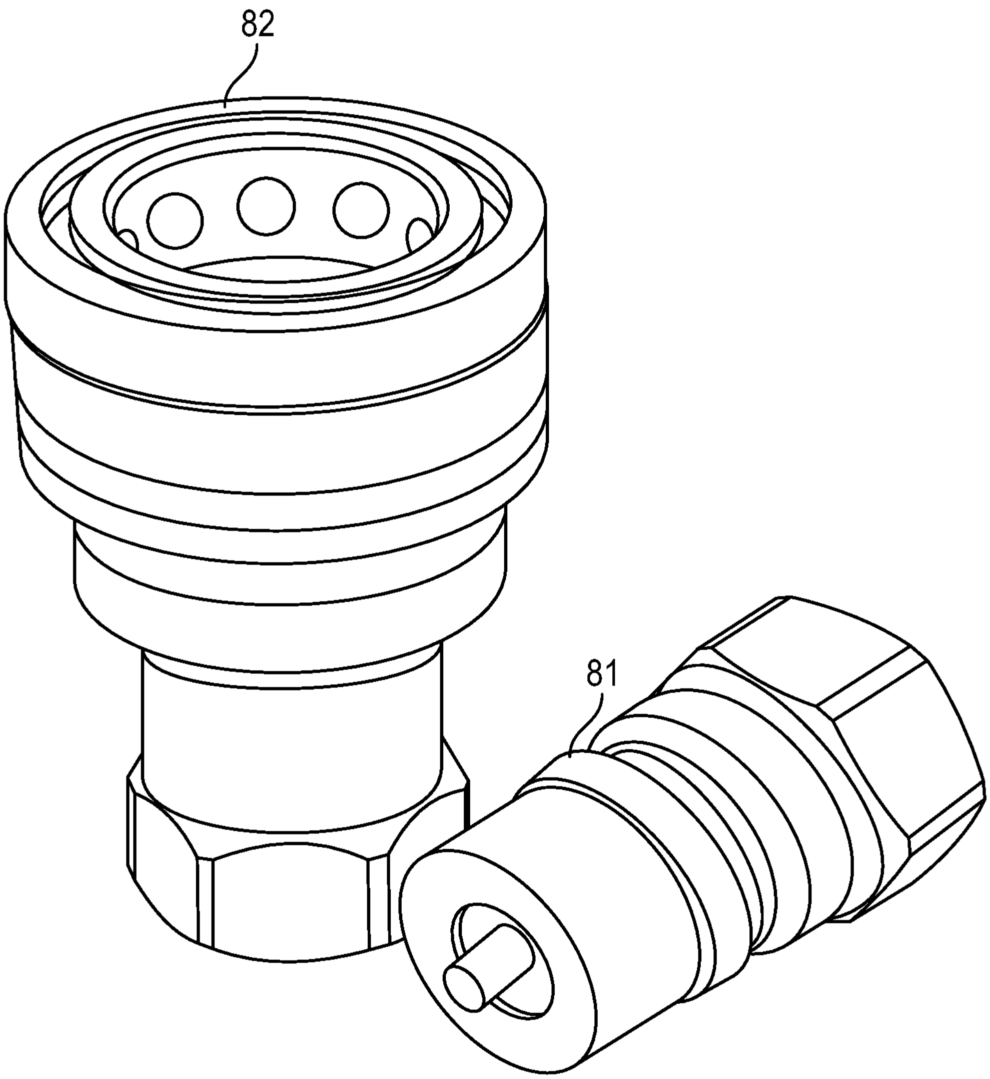
FIG. 8 shows perspective views of known hydraulic fluid line fittings that demonstrate another example of how the safety cap and plug of the present disclosure can be configured.

As another example, FIG. 8 shows perspective views of known hydraulic fluid line fittings 81 and 82 that are configured to be removably connected together via mechanisms other than threads. These fittings are made by several different manufacturers. The safety plug of the present disclosure can have the coupling configuration of the male fitting 81 and the safety cap of the present disclosure can have the coupling configuration of the female fitting 82. In other words, if the fitting 82 is disposed on the end of one fluid line, it would be plugged with a safety plug of the present disclosure having the coupling configuration of the fitting 81. Similarly, if the fitting 81 is disposed on the end of the opposite fluid line, it would be capped with a safety cap of the present disclosure having the coupling configuration of the fitting 82.

Figure 9:
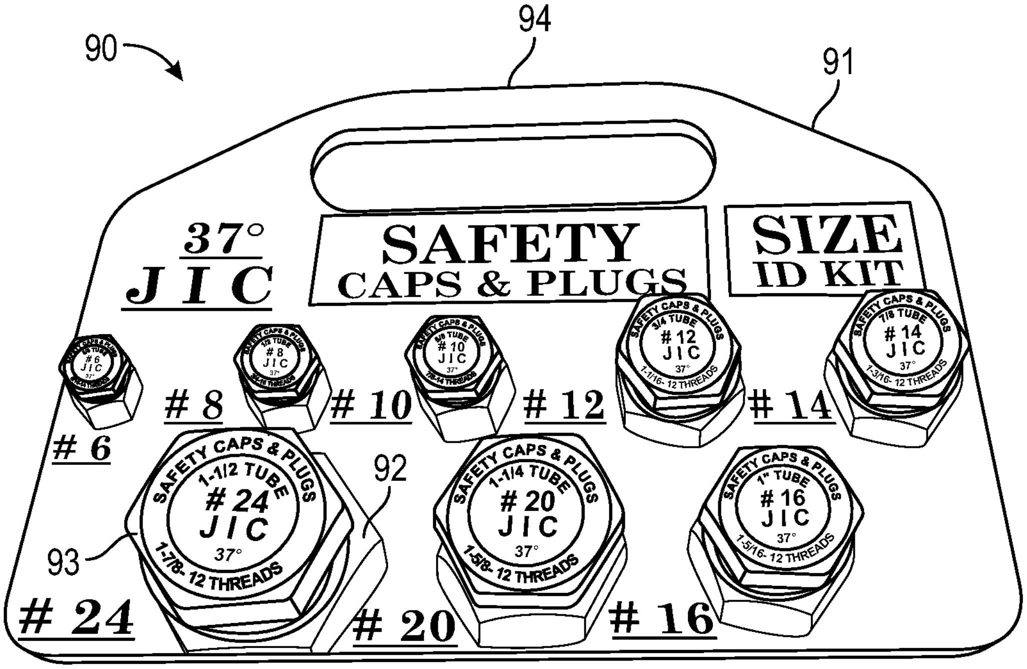
FIG. 9 illustrates a top perspective view of a sizing kit in accordance with an illustrative embodiment comprising a holder similar to the holders shown in FIGS. 4A-6.

FIG. 9 illustrates a top perspective view of a sizing kit 90 in accordance with an illustrative embodiment comprising a holder 91 similar to the holders shown in FIGS. 4A-6. The kit holder 91 is configured to hold a variety of differently sized JIC-style caps 92 and plugs 93. The kit 90 in accordance with this representative embodiment is intended to provide all of the sizes of caps and plugs that a user would typically need to service any hydraulic component within a hydraulic valve system. In accordance with this representative embodiment, the kit 90 holds size #s 6, 8, 10, 12, 16, 20 and 24. In accordance with this embodiment, the caps 92 and plugs 93 also include information about tube size and thread configuration.

In user, after the user disconnects the ends of the lines, the user can attempt to connect the fittings on the ends of the lines to caps 92 or plugs 93 of different sizes until the user fins the cap 92 or plug 93 that fits the fitting on the end of the line. The user can then use, for example, one of the systems described above with reference to FIGS. 4A-6 to cap and plug the lines with the caps and plugs of the proper sizes.

The kit 90 can be made of any suitable material and can have any shape and size. The shape of the kit 90 shown in FIG. 9 is advantageous because it presents the caps 92 and plugs 93 laterally side by side in an array that is easily visible to the user, easy to organize and easy to handle. In accordance with this representative embodiment, the kit 90 comprises a generally flat, clear, hard plastic material and a portion of the 90 is removed to form a handle 94 at an upper portion of the kit 90 to allow it to be easily carried.

It should be noted that the illustrative embodiments have been described with reference to a few embodiments for the purpose of demonstrating the principles and concepts of the invention. Persons of skill in the art will understand how the principles and concepts of the invention can be applied to other embodiments not explicitly described herein. For example, while particular configurations of the safety caps and plugs, the holders and the kit are described herein and shown in the figures, a variety of other configurations may be used, as will be understood by those skilled in the art in view of the description provided herein. Many modifications may be made to the embodiments described herein while still achieving the goals of the inventive principles and concepts, and all such modifications are within the scope of the invention.

What is claimed is:

1. A system of safety caps and plugs for capping and plugging lines, respectively, the system comprising:

at least a first safety cap configured to mate with a first fitting disposed on a first end of a first line when the first fitting has been disconnected from a second fitting disposed on a first end of a second line, the first safety cap including a first identifier that is viewable to a user of the system when the first safety cap is mated with the first fitting;

at least a first safety plug configured to mate with the second fitting when the second fitting has been disconnected from the first fitting, and wherein the first safety plug includes the first identifier that is viewable to the user of the system when the first safety plug is mated with the second fitting, and wherein the first identifier can be viewed by the user when the first safety cap and plug are mated with the first and second fittings, respectively, to allow the user to identify the first and second lines to facilitate reconnection of the first and second fittings to one another during a re-installation process;

at least a second safety cap configured to mate with a third fitting disposed on a first end of a third line when the third fitting has been disconnected from a fourth fitting disposed on a first end of a fourth line, the second safety cap including a second identifier that is viewable to a user of the system when the second safety cap is mated with the third fitting;

at least a second safety plug configured to mate with the fourth fitting when the fourth fitting has been disconnected from the third fitting, and wherein the second safety plug includes the second identifier that is viewable to the user of the system when the second safety plug is mated with the fourth fitting, and wherein the second identifier can be viewed by the user when the second safety cap and plug are mated with the third and fourth fittings, respectively, to allow the user to identify the third and fourth lines to facilitate reconnection of the third and fourth fittings to one another during a re-installation process;

a holder configured to hold the first and second safety caps and plugs; the holder comprises a flat, clear, hard plastic material, and wherein a portion of the holder is removed to form a handle at an upper portion of the holder to allow the holder to be carried by the user; and wherein when the first safety cap and plug are mounted in the holder, the first safety cap and plug are mated with one another thru a first hole formed in the holder having a diameter that is smaller than outer diameters of the first safety cap and plug such that the first safety cap abuts a first side of the holder and the first safety plug abuts a second side of the holder, and wherein when the second safety cap and plug are mounted in the holder, the second safety cap and plug are mated with one another thru a second hole formed in the holder having a diameter that is smaller than outer diameters of the second safety cap and plug such that the second safety cap abuts the first side of the holder and the second safety plug abuts the second side of the holder.

2. The system of claim 1, wherein when the first safety cap and the first safety plug are mated with the first fitting and the second fitting, respectively, the first safety cap and the first safety plug seal the first ends of the first and second lines, respectively.

3. The system of claim 2, wherein the first identifier comprises at least one of a numeral, a color, a sticker and printed text.

4. The system of claim 3, wherein the first safety plug and first safety cap further include at least a size indication that is viewable to the user to allow the user to determine whether a size of the first safety cap and of the first safety plug are compatible with a size of the first fitting and with a size of the second fitting, respectively.

5. The system of claim 4, wherein the first safety plug and first safety cap further include at least a type indication that is viewable to the user to allow the user to determine whether a type of the first safety cap and of the first safety plug are compatible with a type of the first fitting and with a type of the second fitting, respectively.

6. The system of claim 1, wherein when the second safety cap and the second safety plug are mated with the third fitting and the fourth fitting, respectively, the second safety cap and the second safety plug seal the first ends of the third and fourth lines, respectively.

7. The system of claim 1, wherein the second identifier comprises at least one of a numeral, a color, a sticker and printed text.

8. The system of claim 7, wherein the second safety plug and second safety cap further include a size indication that is viewable to the user to allow the user to determine whether a size of the second safety cap and a size of the second safety plug are compatible with a size of the third fitting and with a size of the fourth fitting, respectively.

9. The system of claim 8, wherein the second safety plug and second safety cap further include at least a type indication that is viewable to the user to allow the user to determine whether a type of the second safety cap and of the second safety plug are compatible with a type of the third fitting and with a type of the fourth fitting, respectively.

10. The system of claim 1, wherein the lines are one of hydraulic fluid lines, gas lines and electrical conduits.

11. A system of safety caps and plugs for capping and plugging lines, respectively, the system comprising:

at least a first safety cap configured to mate with a first fitting disposed on a first end of a first line when the first fitting has been disconnected from a second fitting disposed on the first end of a second line, the first safety cap including a first identifier that is viewable to a user of the system when the first safety cap is mated with the first fitting;

at least a first safety plug configured to mate with the second fitting when the second fitting has been disconnected from the first fitting, and wherein the first safety plug includes the first identifier that is viewable to the user of the system when the first safety plug is mated with the second fitting, and wherein the first identifier can be viewed by the user when the first safety cap and plug are mated with the first and second fittings, respectively, to allow the user to identify the first and second lines to facilitate reconnection of the first and second fittings to one another during a re-installation process;

at least a second safety cap configured to mate with a third fitting disposed on a first end of a third line when the third fitting has been disconnected from a fourth fitting disposed on the first end of a fourth line, the second safety cap including a second identifier that is viewable to a user of the system when the second safety cap is mated with the third fitting;

at least a second safety plug configured to mate with the fourth fitting when the fourth fitting has been disconnected from the third fitting, and wherein the second safety plug includes the second identifier that is viewable to the user of the system when the second safety plug is mated with the fourth fitting, and wherein the second identifier can be viewed by the user when the second safety cap and plug are mated with the third and fourth fittings, respectively, to allow the user to identify the third and fourth lines to facilitate reconnection of the third and fourth fittings to one another during a re-installation process;

a holder configured to hold the first and second safety caps and plugs; and wherein the holder comprises a tubular structure having an inner diameter that is larger than outer diameters of the first and second safety caps and plugs, the tubular structure being capped at a bottom side of the tubular structure and at a top side of the tubular structure with bottom and top screw-in caps, respectively, that can be unscrewed to allow the safety caps and plugs to be removed from the tubular structure, the tubular structure having a device on an exterior surface thereof configured to allow the holder to be hung on an external structure.

12. The system of claim 11, wherein the lines are one of hydraulic fluid lines, gas lines and electrical conduits.

13. The system of claim 11, wherein when the second safety cap and the second safety plug are mated with the third fitting and the fourth fitting, respectively, the second safety cap and the second safety plug seal the first ends of the third and fourth lines, respectively.

14. The system of claim 11, wherein the second identifier comprises at least one of a numeral, a color, a sticker and printed text.

15. The system of claim 14, wherein the second safety plug and second safety cap further include a size indication that is viewable to the user to allow the user to determine whether a size of the second safety cap and a size of the second safety plug are compatible with a size of the third fitting and with a size of the fourth fitting, respectively.

16. The system of claim 15, wherein the second safety plug and second safety cap further include at least a type indication that is viewable to the user to allow the user to determine whether a type of the second safety cap and of the second safety plug are compatible with a type of the third fitting and with a type of the fourth fitting, respectively.

* * * * *